United States Patent
Kerschbaum et al.

(10) Patent No.: US 9,830,470 B2
(45) Date of Patent: Nov. 28, 2017

(54) ENCRYPTING DATA FOR ANALYTICAL WEB APPLICATIONS

(71) Applicant: SAP SE, Walldorf (DE)

(72) Inventors: Florian Kerschbaum, Karlsruhe (DE); Benny Fuhry, Karlsruhe (DE); Wei Xu, Wiesloch (DE); Josef Köeble, Heilbronn (DE); Walter Tighzert, Heidelberg (DE)

(73) Assignee: SAP SE, Walldorf (DE)

( * ) Notice: Subject to any disclaimer, the term of this patent is extended or adjusted under 35 U.S.C. 154(b) by 70 days.

(21) Appl. No.: 14/880,095

(22) Filed: Oct. 9, 2015

(65) Prior Publication Data
US 2017/0103227 A1 Apr. 13, 2017

(51) Int. Cl.
  *G06F 21/62* (2013.01)
  *H04L 9/08* (2006.01)
  *H04L 29/06* (2006.01)

(52) U.S. Cl.
  CPC ........ *G06F 21/6227* (2013.01); *H04L 9/0819* (2013.01); *H04L 63/0281* (2013.01)

(58) Field of Classification Search
  CPC .................................................. G06F 21/6227
  See application file for complete search history.

(56) References Cited

U.S. PATENT DOCUMENTS

| 7,818,200 | B2 | 10/2010 | Kerschbaum et al. |
|---|---|---|---|
| 7,836,483 | B2 | 11/2010 | Kerschbaum et al. |
| 7,860,244 | B2 | 12/2010 | Kerschbaum |
| 7,860,245 | B2 | 12/2010 | Kerschbaum et al. |
| 7,869,598 | B2 | 1/2011 | Kerschbaum |
| 7,873,840 | B2 | 1/2011 | Agrawal et al. |
| 7,986,780 | B2 | 7/2011 | Kerschbaum et al. |
| 7,995,750 | B2 | 8/2011 | Kerschbaum et al. |
| 8,010,782 | B2 | 8/2011 | Kerschbaum |
| 8,015,080 | B2 | 9/2011 | Kerschbaum et al. |
| 8,045,711 | B2 | 10/2011 | Kerschbaum |
| 8,060,758 | B2 | 11/2011 | Kerschbaum et al. |
| 8,130,947 | B2 | 3/2012 | Kerschbaum et al. |
| 8,131,999 | B2 | 3/2012 | Kerschbaum |
| 8,150,041 | B2 | 4/2012 | Kerschbaum |

(Continued)

OTHER PUBLICATIONS

Mallaiah et al., "A stateless Key Management Technique for Protection of Sensitive Data at Proxy Level for SQL based Databases using NIST Recommended SP800-132", 2015, 8 pages.*

(Continued)

*Primary Examiner* — Thaddeus Plecha
(74) *Attorney, Agent, or Firm* — Fish & Richardson P.C.

(57) ABSTRACT

Methods, systems, and computer-readable storage media for processing queries in analytical web applications over encrypted data. Implementations include actions of receiving, by a database driver executed on a server-side computing device and from a client-side proxy, a query and one or more encryption keys, the one or more encryption keys having been selected by the client-side proxy based on operations required to perform the query, performing at least one operation of the query to provide a query result including encrypted data, and transmitting, by the database driver, the encrypted data to the client-side proxy, the client-side proxy processing the encrypted data to provide plaintext data to an end user.

20 Claims, 5 Drawing Sheets

(56) References Cited

U.S. PATENT DOCUMENTS

| | | |
|---|---|---|
| 8,291,509 B2 | 10/2012 | Kerschbaum et al. |
| 8,321,666 B2 | 11/2012 | Kerschbaum |
| 8,327,128 B1 | 12/2012 | Prince et al. |
| 8,365,298 B2 | 1/2013 | Kerschbaum et al. |
| 8,473,741 B2 | 6/2013 | Kerschbaum |
| 8,526,603 B2 | 9/2013 | Kerschbaum |
| 8,533,487 B2 | 9/2013 | Kerschbaum et al. |
| 8,538,799 B2 | 9/2013 | Haller et al. |
| 8,548,172 B2 | 10/2013 | Kerschbaum |
| 8,572,405 B2 | 10/2013 | Kerschbaum |
| 8,584,232 B2 | 11/2013 | Kerschbaum |
| 8,639,947 B2 | 1/2014 | Elovici et al. |
| 8,688,973 B2 | 4/2014 | Kerschbaum et al. |
| 8,731,199 B2 | 5/2014 | Jawurek et al. |
| 8,806,223 B2 | 8/2014 | Crowe |
| 8,811,620 B2 | 8/2014 | Chaves et al. |
| 8,817,978 B2 | 8/2014 | Jho et al. |
| 8,839,410 B2 | 9/2014 | Kerschbaum |
| 8,880,867 B2 | 11/2014 | Jawurek et al. |
| 9,002,868 B2 | 4/2015 | Zurek |
| 9,003,204 B2 | 4/2015 | Haerterich et al. |
| 9,025,834 B2 | 5/2015 | Hang et al. |
| 9,037,860 B1 | 5/2015 | Kerschbaum et al. |
| 9,064,229 B2 | 6/2015 | Chaves et al. |
| 9,111,071 B2 | 8/2015 | Kerschbaum |
| 9,159,046 B2 | 10/2015 | Kerschbaum |
| 9,213,764 B2 | 12/2015 | Kerschbaum et al. |
| 9,275,249 B1 * | 3/2016 | Allen .................. G06F 21/6227 |
| 9,342,707 B1 | 5/2016 | Kerschbaum et al. |
| 2007/0174271 A1 * | 7/2007 | Mattsson .......... G06F 17/30477 |
| 2007/0203944 A1 | 8/2007 | Batra et al. |
| 2009/0327748 A1 | 12/2009 | Agrawal et al. |
| 2012/0121080 A1 | 5/2012 | Kerschbaum |
| 2012/0260157 A1 * | 10/2012 | Zhu ................... G06F 17/30902 715/234 |
| 2013/0061054 A1 * | 3/2013 | Niccolai ................. G06F 21/10 713/171 |
| 2013/0064362 A1 | 3/2013 | Tang et al. |
| 2013/0191650 A1 * | 7/2013 | Balakrishnan ...... G06F 21/6227 713/190 |
| 2014/0089678 A1 | 3/2014 | Teranishi |
| 2014/0095860 A1 | 4/2014 | Shikfa et al. |
| 2014/0122866 A1 | 5/2014 | Haeger et al. |
| 2014/0164758 A1 | 6/2014 | Ramamurthy et al. |
| 2015/0019879 A1 | 1/2015 | Haerterich et al. |
| 2015/0039586 A1 | 2/2015 | Kerschbaum et al. |

OTHER PUBLICATIONS

Communication from European Patent Office for EP Application No. S13014EU-ro; with EESR mailed Dec. 23, 2016 (7 pages).
Krishna, P.N. Puttaswamy et al. "Silverline: Toward Data Confidentiality in Storage-intensive Cloud Applications", Cloud Computing, ACM, 2 PENN Plaza, Suite 701 New York, NY 10121-0701, USA, dated Oct. 26, 2011, pp. 1-13, XP058005043 (ISBN: 978-1-4503-0976-9).
Benny Fuhry et al. "Encrypting Analytical Web Application", Cloud Computing Security Workshop, ACM, 2 PENN Plaza, Suite 701 New York, NY 10121-0701, USA, dated Oct. 28, 2016, pp. 35-46, XP058282098 (ISBN: 978-1-4503-4572-9).

* cited by examiner

ENCRYPTING DATA FOR ANALYTICAL WEB APPLICATIONS

BACKGROUND

The software-as-a-service (SaaS) market is growing. SaaS can be described as a software licensing and delivery model, in which software is licensed on a subscription basis and is centrally hosted by a third-party service provider (e.g., in the cloud). In some examples, SaaS is accessed by customers using a thin client on a web browser. In some examples, customers provide customer data to the SaaS service provider, over which data a web application performs operations. However, customers are concerned about the confidentiality of their data in the cloud. For example, motivated hackers and/or malicious insiders could try to steal customer data.

Encryption is a potential solution, but supporting the necessary functionality in existing web applications is difficult. For example, analytical web applications perform extensive data processing operations in databases, which databases store encrypted data (customer data). Existing solutions for encrypting data processed by web applications poorly support functionality required by the web applications.

SUMMARY

Implementations of the present disclosure include computer-implemented methods for encrypting data for analytical web applications. In some implementations, actions include receiving, by a database driver executed on a server-side computing device and from a client-side proxy, a query and one or more encryption keys, the one or more encryption keys having been selected by the client-side proxy based on operations required to perform the query, performing at least one operation of the query to provide a query result including encrypted data, and transmitting, by the database driver, the encrypted data to the client-side proxy, the client-side proxy processing the encrypted data to provide plaintext data to an end user. Other implementations of this aspect include corresponding systems, apparatus, and computer programs, configured to perform the actions of the methods, encoded on computer storage devices.

These and other implementations can each optionally include one or more of the following features: performing at least one operation of the query further includes determining, by the database driver, that a particular re-encryption key is needed, transmitting, by the database driver, a request for the particular re-encryption key to the proxy, and receiving, by the database driver, the particular re-encryption key from the proxy; performing the at least one operation of the query includes decrypting at least a portion of a set of encrypted data stored in the database using an encryption key of the one or more encryption keys to provide lower-level encrypted data in a multi-layer encryption scheme, the encrypted data of the query results including the lower-level encrypted data; the lower-level encrypted data is encrypted based on at least one of deterministic encryption and order-preserving encryption; actions further include providing, by the database driver, a first query part and a second query part based on the query, the first query part including the at least one operation, transmitting, by the database driver, the second query part to the client-side proxy with the lower-level encrypted data, wherein processing the lower-level encrypted data to provide plaintext data is performed by the proxy based on the second query part; the proxy is stateless; and the query includes at least one encrypted parameter.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to processing queries in analytical web applications over encrypted data. More particularly, and as described in detail herein, implementations of the present disclosure employ a proxy that adjusts encryption of encrypted data stored in a database to the level necessary for a customer's use and also supports additively homomorphic encryption. In some implementations, the proxy is stateless, and only the database driver of the application is modified. An evaluation of an example instantiation of the present disclosure, described in further detail herein, slightly increases page load time on average, but a significant portion of the encrypted data remains probabilistically encrypted, which is more secure than other encryption levels. Consequently, implementations of the present disclosure increase the security of the data at the cloud provider at a moderate performance cost.

Figure 1:
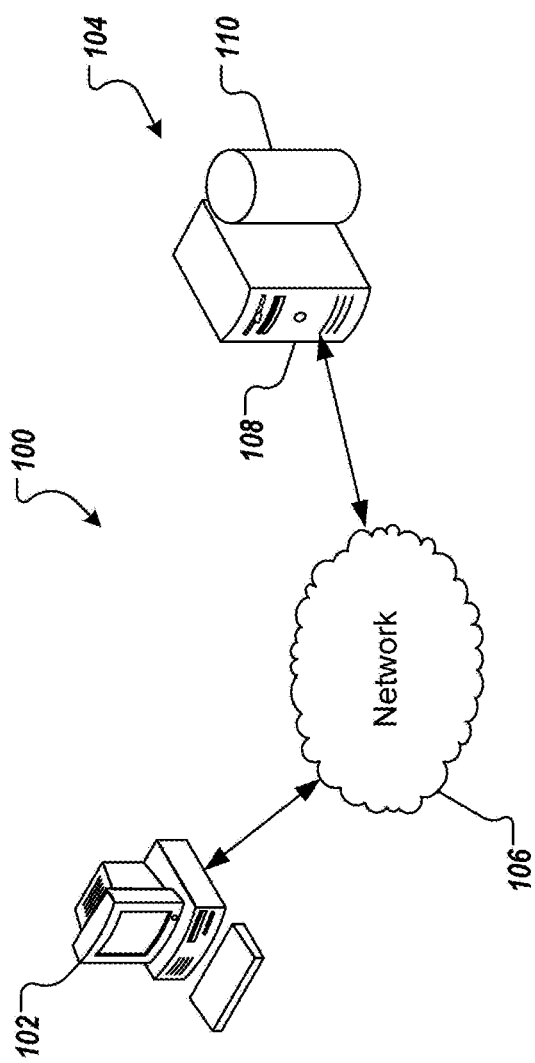
FIG. 1 depicts an example high-level architecture in accordance with implementations of the present disclosure.

FIG. 1 depicts an example high-level architecture 100 in accordance with implementations of the present disclosure. The high-level architecture 100 includes a computing device 102 (e.g., client-side), a server system 104, and a network 106. In some examples, the computing device 102 and the server system 104 communicate over the network 106. In some examples, the computing device 102 can communicate with the server system 104 over one or more networks (e.g., including the network 106). In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the server system 104 includes at least one server device 108 and at least one data store 110. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the computing device 102) over the network 106.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In accordance with implementations of the present disclosure, the server system 104 maintains a database that stores encrypted data (e.g., an encrypted database). In some examples, the data (plaintext) is encrypted at the computing device 102 (client-side), and the encrypted data (ciphertext) is sent to the server system 104 over the network 106 for storage. In some implementations, and as described herein, the server system 104 can be provided by a third-party service provider, which stores and provides access to the encrypted data.

In some implementations, a database is part of a database system that also includes a query execution engine. In some examples, the query execution engine receives a query (e.g., a search token from a client), provides a query plan based on the query, executes the query plan to provide a response (e.g., encrypted data from the database that is responsive to the query), and transmits the response to the client (e.g., from which the query was received).

In some implementations, the server system 104 hosts an analytical web application that a customer can access (e.g., using a thin client on a web browser executed by the computing device 102). In some examples, the analytical web application processes the encrypted data stored in the database, in response to commands input by the customer.

When outsourcing software to the cloud (e.g., in a SaaS paradigm), customers are concerned about the confidentiality of their data. Service providers store and process customer data on behalf of the customer. However, motivated hackers and/or malicious insiders could try to steal the customer data. Furthermore, governments now have options to seize customer data (e.g., at the cloud provider (server-side), at the customer (client-side)), which may cause problems for the customers (e.g., in cases of cross-border investigations.

Encryption is a commonly proposed countermeasure to these problems. However, processing data while it is encrypted is difficult. Fully homomorphic encryption is the panacea: highly secure, but too slow for practical adoption and difficult to integrate into existing cloud applications. In some cases, commercial vendors offer (format-preserving) deterministic encryption (DET), and/or order-preserving encryption (OPE) as an alternative. This solution has the advantage that the application does not need to be modified and the performance penalty is small. However, the security of this solution is questionable, because the encryption must not interfere with any possible function of the application, or the application's functions must be restricted. For example, if the application displays a table of results that can be sorted according to any column, by default all columns must be encrypted using OPE, whether the sorting is actually used. Encryption for processing numbers is not supported at all by these solutions.

In another approach, data is encrypted using (multi-key) searchable encryption. This enables stronger (than DET) encryption, but requires a different database and search interface to be used in the application. For example, searchable encryption requires its own search algorithm, and only offers limited search capabilities. Consequently, the application is restricted and requires significant modification. Further, encryption for processing numbers is still not supported in this approach.

In view of this context, implementations of the present disclosure provide another approach for encrypting data to be processed by analytical web applications. As described in further detail herein, implementations of the present disclosure adjust the encryption to particular functionality needed by the application. The idea of multi-layer (onion) encryption was first popularized by CryptDB, where it was implemented for a single query (SQL query) at a time. Implementations of the present disclosure extend multi-layer encryption to the distributed setting of a web application. In accordance with implementations of the present disclosure, the distributed setting includes the client (web browser), a proxy, the application server, and the database. In the CryptDB context, a proxy is provided between the application and the database. In accordance with the present disclosure, a proxy is provided between a browser (e.g., web browser) and an application (e.g., web application).

As discussed in further detail herein, implementations of the present disclosure achieve example advantages. For example, the proxy is stateless. Although, the proxy encrypts requests from the client, and decrypts responses from the application server based on the application's control flow and functions, the proxy does not maintain any state except the encryption keys. Consequently, the proxy can be easily replicated and administered. Further, only the database driver is modified to integrate implementations of the present disclosure. In some examples, only need the database driver, a standard component of the application server is replaced. The web application can continue to query the database using its full functionality. The database, including its search algorithms, is not modified. Also, encryption is adjusted to the application's control-flow and additive homomorphic encryption (HOM) is supported. In accordance with implementations of the present disclosure only those database fields that are being used for search can be encrypted using DET or OPE, and encryption using HOM is for processing numbers is supported, as prevalent in many analytical applications. In some implementations randomized encryption (RND) can be used.

To provide additional context for the present disclosure, encryption between the application server and database, encryption using a proxy, and encryption in the web browser will be discussed.

Various technologies exist for end-to-end encryption of a database. In one example, queries can be processed directly over DET encrypted data. In this example, search is efficient, because the database does not need to be modified and search operates as on plaintexts. Range queries, however, are problematic. OPE is another example, which solved range queries also with plaintext search. Still, static OPE could not achieve optimal security.

Multi-layer (onion) encryption, also referred to as adjustable encryption, modifies the database driver for encryption and decryption. Implementations of the present disclosure advance over this approach by extending the encryption to the application server, while the key is completely retained at the client. This approach of the present disclosure fits the common software-as-a-service (SaaS) model better than database encryption alone.

Another database encryption approach is searchable encryption. Searchable encryption can be described as a semantically secure encryption scheme that only leaks the search and access pattern of queries. In some examples, searchable encryption still requires a linear scan of all data for searching. Other encryption schemes include sublinear search time. Such encryption schemes can operate, for example, by building an index on the encrypted data. Some encryption schemes even supports efficient deletions.

However, approaches based on searchable encryption suffer from limited search capabilities. For example, many functions (e.g., grouping, join, aggregation, each commonly used in any SQL database) are not supported. Consequently, using searchable encryption requires significant changes to the application, and is not suited for analytical applications.

Another approach of securing databases in the cloud is to separate the database between two cloud providers. Some approaches extended this to multiple databases and cloud providers. While this approach is good in terms of performance, because little to no encryption is required, it is somewhat questionable from a security perspective. For example, this approach rests on the assumption that the cloud providers offer a common service, in which they collaborate, but do not exchange data (i.e., they do not collude). This seems somewhat paradoxical given that the working assumption for all of these approaches is that the cloud provider is untrusted. As discussed in further detail herein, implementations of the present disclosure works with a single cloud provider.

With respect to web applications, an example approach encrypts an entire web application stack using partially homomorphic encryption, but the private keys for the homomorphic encryption reside in the virtual machine monitor at the cloud provider. While this provides a level of protection against the application, administrators or skilled hackers may be able to access the virtual machine monitor layer. In contrast, and as described in further detail herein, implementations of the present disclosure store keys at the client, which can monitor accesses and at least detect breaches.

Referring now to encryption by a proxy, example approaches will be discussed to provide further context for an advantages of implementations of the present disclosure. One example approach provides a proxy that encrypts data when it is not used. In this example approach, the proxy downloads and decrypts the data before use. When complex operations are performed by the cloud provider that cannot operate on (deterministic) encryption (e.g., aggregations), the data is decrypted to plaintext. The proxy then runs a scheduling algorithm to determine when best to re-encrypt data after its use. Another example approach does not support adaptive decryption and re-encryption, and is consequently, a simpler, easier-to-deploy design. However, this example approach does not support the same functionality or security, and is dependent on the functionality of the cloud provider. Further, in this approach, the proxy needs to adapt its configuration to application changes. In each of these example proxy encryption approaches, the functionality supported by the proxy is limited. In these approaches, for example, the proxy needs to be adapted to the individual applications (e.g., when the application changes the proxy needs to change).

In contrast to these example approaches, implementations of the present disclosure provide a service description language in order to make this adaption as efficient as possible. Further, the proxy of the present disclosure is built into an architecture that is independent of the application.

There are several commercial systems that follow the proxy encryption model. Each of these suffer the same problems as the example proxy encryption approaches discussed above. In contrast, and as discussed in further detail herein, implementations of the present disclosure include a security feature: encrypting numbers for processing using additively homomorphic encryption.

With regard to encryption by the web browser, an example approach includes building web applications using searchable encryption. As discussed above, any system based on searchable encryption requires modified search functions. In the example approach, modified search functions are provided through an application program interface (API). This approach also supports data sharing using proxy reencryptable searchable encryption. Proxy re-encryption supports changing an encryption key without intermediate decryption. Consequently, each user can have its own key, and still the cloud provider does not learn plaintexts, but can perform (simple) searches. This example approach also employs features, such as code signing, in order to protect the data in the browser from malicious application code. This example approach, however, requires installation of a browser extension at the client. Another example approach is also installed as a browser extension, and uses the browser's document object model (DOM) to perform encryption and decryption. This has the advantage that malicious application code cannot access the data. This example approach, however, only supports few operations by the cloud provider.

In contrast, and as described in further detail herein, implementations of the present disclosure function largely independently of the browser, and do not require any modification to the browser (e.g., no browser extension). Implementations of the present disclosure also require less change to the application and only modify the database driver (a standard component of applications). Further, implementations of the present disclosure support more operations than simple search, such as grouping, joins and aggregations, which are typical for analytical applications.

In view of the above context, implementations of the present disclosure will be described in detail.

Figure 2:
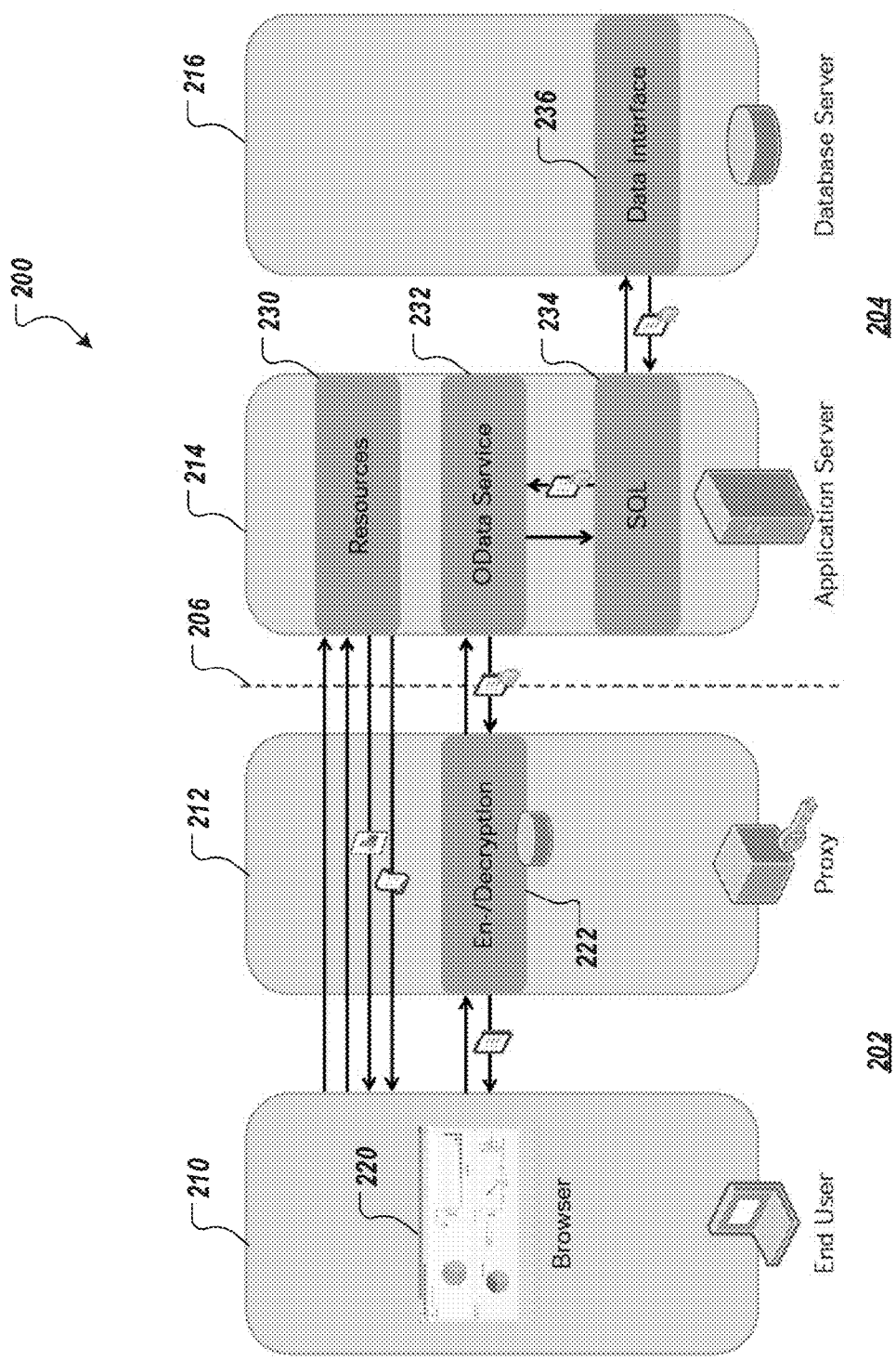
FIG. 2 depicts an example component architecture in accordance with implementations of the present disclosure.

FIG. 2 depicts an example component architecture 200 in accordance with implementations of the present disclosure. The component architecture 200 includes a trusted-side 202, and an untrusted-side 204, demarcated by a trust boundary 206. Components of the example architecture 200 include an end user 210, a proxy 212, an application server 214, and a database server 216. In some examples, the application server 214 and the database server 216 can be included in a single server (e.g., they are not necessarily different servers). In the depicted example, the end user 210 executes a browser 220. For example, the end user 210 include a client-side computing device (and/or a user that uses the client-side computing device). In the depicted example, the proxy 212 includes a cryptography module 222 that, for example, encrypts query messages to be sent to the untrusted-side 204, and decrypts query results received from the untrusted-side 204. In some examples, the proxy 212 is stateless, and accesses encryption keys. In some implementations, the proxy 212 is provided on an application server executed at the client-side. In some implementations, the proxy 212 is provided across multiple application servers at the client-side. In some examples, the proxy 212 also includes a local database (not shown) for storing results returned from the application server 214, and which supports post-processing, described in further detail herein.

In some implementations, the application server 214 hosts an application (e.g., an analytical web application) that the end user 210 interacts with through the browser 220. More particularly, and in accordance with the present disclosure, the end user 210 interacts with the application server 214 (and the application) through the proxy 212. In some implementations, the application server 214 queries a database managed by the database server 216. For example, the application hosted by the application server 214 can include functionality that requires querying of data from the database maintained at the database server. In accordance with implementations of the present disclosure, data stored in the database is encrypted (e.g., using multi-layer, adjustable encryption, as described herein). In the depicted example, the application server includes resources 230, a service component 232 (e.g., OData service), and a database driver 234 (e.g., SQL database driver). The database server includes a data interface component 236.

In some implementations, the end user 210 requests (e.g., through HTTP requests) one or more of the resource 230 from the application server 214 through the proxy 202. For example, the end user 210 can request text and/or images, which are displayed in a (web) page of the application. In some examples, such resource requests are unencrypted.

In some implementations, the end user 210 queries the database through the application. For example, the end user 210 transmits a database query to the proxy 212, which encrypts at least a portion of the query (e.g., the parameters), and transmits the encrypted query to the application server 214. In some example, the service 232 receives the encrypted query and provides the encrypted query to the database driver 234. In some examples, the database driver 234 processes the encrypted query, as described in detail herein. For example, the database driver 234 can split the query into multiple query parts and/or transmit a request for an encryption key to the proxy 212 (e.g., if a layer of the multi-layer encryption is to be decrypted to executed at least a portion of the query). In some examples, an encryption key is requested, if a column must be reencrypted to support table joins.

The database driver 234 queries the database server based on the encrypted query. In some examples, the application server 214 provides an encrypted query result back to the proxy, which decrypts the encrypted query result to provide a plaintext result to the end user 210. In some examples, in the case of query splitting described in further detail herein, the application server 214 provides an encrypted partial query result and a query part to the proxy 212, which decrypts the encrypted partial query result to provide a plaintext partial results, and executes the query part on the plaintext partial result to provide a plaintext query result. In some examples, decrypted values are inserted into a local database, which is used for executing the query part.

Implementations of the present disclosure introduce the proxy and the database driver, which is integrated into the architecture of the web application. Because the database driver is modified, implementations of the present disclosure target web application architectures that cleanly separate database queries from other application code and user interface. One such architecture includes the UI5 framework for web applications provided by SAP SE of Walldorf, Germany. In the UI5 framework, the web application is largely executed as JavaScript in the web browser. The user interface components (e.g., images) and design (as well as other resources) are downloaded as HTML and CSS integrated with the JavaScript code. In order to persistently store and process data on the cloud server, the client issues requests (e.g., OData requests), which are processed by a database engine (e.g., the HANA XS Engine provided by SAP SE of Walldorf, Germany). In some implementations, the requests are translated into queries (e.g., SQL queries) for the database back-end. The client processes the query responses and displays the query responses using dynamically created HTML.

In accordance with implementations of the present disclosure, the proxy encrypts the data, such as constants, in the queries, and decrypts the query result. As described in further detail herein, implementations of the present disclosure support post-processing of the queries in the proxy that are not supported on encrypted data. In some examples, the database driver splits the query into two query parts: a first query part (e.g., which can include one or more queries) that can be executed on encrypted data, and a second query part that cannot. In some examples, the first query part and the second query part together deliver the same result as the original query would have. In some implementations, the second query part and the result of the first query part are sent to the proxy. The proxy decrypts the result to provide plaintext, and processes the second query part on the plaintext. The result of the second query part is sent to the client.

Implementations of the present disclosure are designed to increase the burden for accessing data at the cloud provider's site. An example threat model is provided based on the trust boundary 206 of FIG. 2. The example threat model entails hackers and/or malicious insiders trying to access the client's data. In some implementations, and to hinder malicious programmers, code signing can be provided for code executed at the client to introduce a level of indirection, because the application provider (programmer) needs to sign the code and is inherently trusted. In some implementations, the proxy verifies the signatures and hence no modifications to the client, such as a browser extension, are necessary.

Besides encryption of the client data, implementations of the present disclosure provide a policy mechanism for key release. In some examples, the proxy already provides the necessary keys for decryption, and the database driver only requests keys that would be needed for re-encryption. In some examples, in order to adjust the encryption, the database driver requests the key(s) for the outer layer(s) of the onion encryption. In some examples, the policy mechanism is implemented, such that the cloud provider cannot request arbitrary keys from the client. Instead, the client matches each request against a policy for an allow or deny decision. In the case of deny, the application's performance may be adversely affected, but the security of the client is preserved. This prevents key exfiltration attacks by the cloud provider.

The encryption scheme of the present disclosure is designed to provide maximum security given the functionality and performance needed to execute the application. In some examples, only those columns that the client actually used for search are deterministically encrypted. Consequently, several columns can remain under an encryption that is stronger than deterministic encryption. In some implementations, additively homomorphic encryption is integrated for restricted number processing. In some examples, more complex operations can then be executed by the proxy on the plaintext. Using proxy post-processing, implementations of the present disclosure support the full functionality of SQL, and the application programmer can resort to this standard interface.

Implementations of the present disclosure employ several different encryption schemes that support different operations in SQL. Example encryption schemes include standard AES encryption (in GCM mode) (e.g., a RND scheme), deterministic encryption (DET), order-preserving encryption (OPE), and additively homomorphic encryption (HOM). The features of DET, OPE, and HOM are summarized herein. Because, AES is so well known, the features of AES are not summarized herein.

DET always maps a given plaintext to the same ciphertext. Consequently, equality comparisons can be performed between ciphertexts as well as between plaintexts. This enables the database in the cloud to perform equality comparisons using the same algorithm as used for plaintexts (no change to the database is needed). By default, implementations of the present disclosure encrypt each database column with a different key. This enables comparison between the column-values and a constant provided in the query. However, comparisons between columns are not possible, unless the keys between to-be-compared columns are adjusted to the same key.

Implementations of the present disclosure use proxy re-encryption to change the key, which can be performed by the cloud provider without downloading the database ciphertexts. Further, the change is persistent, which saves costs for future queries. In some examples, a column is selected for adjustment. In some examples, Pohlig-Hellman encryption is used over the elliptic curves as the DET scheme, because it supports the required proxy re-encryption.

In OPE, order of the plaintext is preserved in the ciphertexts. Consequently, greater-than comparisons can be performed between ciphertexts as between plaintexts. This enables the database in the cloud to perform greater-than comparisons using the same algorithm as used for plaintexts. Unfortunately, no proxy re-encryption scheme for (secure) OPE is available. Consequently, the same key adjustment algorithm as for DET cannot be used for OPE. In view of this, implementations of the present disclosure encrypt each database type (e.g., string, integer) with its own key. In some examples, it is assumed that comparisons between different types are the rare exception.

Furthermore, the OPE scheme implemented by the present disclosure is deterministic. This is due to the onion layering of the encryption schemes. In some examples, a randomization in the lower layers would propagate to the upper layers. The lower, order-preserving layer continues to support the equality comparisons of the upper, deterministic layer.

In view of these requirements, an example OPE scheme is used (the "Boldyreva OPE scheme"), which, while not secure against ordered-chosen plaintext attack (OCPA), is compatible with onion encryption, because it requires no mutations. Furthermore, the Boldyreva OPE scheme is stateless, which fits the stateless proxy architecture of the present disclosure.

In HOM, one operation on the ciphertexts maps to addition of the plaintexts. Consequently, additions can be performed using the ciphertexts. However, the result of the addition is still encrypted in the homomorphic encryption scheme. Consequently, HOM can be used to implement aggregations in the database. In some examples, plaintext addition is replaced by the homomorphic operation (e.g., modular multiplication). In some databases, this can be done using user-defined functions (UDF), although a native implementation can be more efficient.

In accordance with implementations of the present disclosure, each column is encrypted with its own key, and addition between columns on the cloud database are not supported. Further, multiplication between columns is not supported by the HOM scheme either. Implementations of the present disclosure use Paillier encryption as the additively HOM scheme.

In accordance with the present disclosure, to match the database operation to the appropriate encryption scheme the encryption is layered. In some examples, each data item x in a column is first encrypted using order-preserving encryption: $E^{OPE}(x)$. This ciphertext is encrypted using deterministic encryption: $E^{DET}(E^{OPE}(x))$. The ciphertext is again encrypted using probabilistic encryption: $E^{RND}(E^{DET}(E^{OPE}(x)))$. Initially, this three-layer ciphertext is stored in the database. Along with the layered ciphertext, for each numerical data item x, an additively homomorphic encryption: $E^{HOM}(x)$ is also stored. As discussed in further detail herein, both ciphertexts form the basis for searching over encrypted data.

In some implementations, all keys for the encryption schemes are maintained at the proxy. In some examples, $\mathcal{K}_x^{RND|DET|OPE}$ is the secret key for column X for the respective encryption scheme RND, DET, or OPE. In order to simplify key management, all keys are derived from a master key using a secure key derivation scheme.

Table 1 shows database operations supported by the different encryption schemes:

TABLE 1

DB Operations Supported by Encryption Scheme

| Operation | RND | DET | OPE | HOM |
|---|---|---|---|---|
| Equi-Selection | | x | x | |
| Range-Selection | | | x | |
| Equi-Join | | x | x | |
| Range-Join | | | x | |
| Projection | x | x | x | x |
| Set Union | x | x | x | x |
| Set Difference | | x | x | |
| Group By | | x | x | |
| Count | x | x | x | |
| Count Distinct | | x | x | |
| Summation | | | | x |

Except for summation, the inner layers of the multi-layer encryption (i.e., $E^{RND}(E^{DET}(E^{OPE}(x)))$) support more operations than the outer layers. Furthermore, it can be assumed that RND (probabilistic encryption) is more secure than DET, which is more secure than OPE.

As discussed above, implementations of the present disclosure adjust the encryption as needed. In some implementations, the database driver maintains the state of the encryption of each column. In some examples, whenever the user issues a query, the database driver determines the operations to-be-executed in response to the query, and maps the operations to the respective encryption schemes (e.g., as in Table 1). The identified encryption schemes are compared to the state of the encryption of respective columns.

If the column is encrypted using a more outer layer than required, then an adjusting decryption is performed. In some examples, the client sends the key(s) along with the request to the database driver, and the database driver removes the outer layer(s) by decryption. The decryption is only performed to the outermost layer required for the respective operation(s). If the column is already encrypted to an appropriate layer, no action is required.

In some implementations, the adjustment is never reversed except by administrator intervention. For example, it can be assumed that, once the cloud provider has learned a ciphertext, the ciphertext can use it for cryptanalysis. Because it may be difficult to determine when a successful attack has occurred, the worst case assumption that the cloud provider is always subverted by the adversary is used.

A challenge is that the database driver maintains the state of the database, whereas the keys are held and the encryption of the query is performed by the proxy. Consequently, the proxy, which also performs query analysis in order to determine the necessary encryption scheme, operates without knowledge of the state of the database. Implementations of the present disclosure address this challenge in the following manner: The proxy determines the necessary encryption scheme based on the query (OData query) where possible. Complex services (OData services) can be configured in the proxy. The proxy assumes that the layered encryption is at the outermost layer (i.e., the initial state). The proxy sends all necessary decryption keys for adjusting decryption from the outermost layer to the necessary layer along with the query. The database driver analyses the query again, determines the necessary encryption scheme, and compares them to the database state. If an adjustment is necessary, the database driver uses the supplied keys for decryption and caches the keys. If no adjustment is necessary, the database driver discards the keys.

In accordance with implementations of the present disclosure, the proxy also encrypts the constant parameters of the queries. In some examples, the encryption of these parameters matches the encryption of the database. In some examples, the proxy again assumes that the layered encryption is at the outermost layer necessary for the operation, and encrypts the parameters correspondingly. The database driver compares the assumed layer against the actual layer (based on the database state). If the actual layer is a more inner layer, the database driver uses the cached keys to adjust the encryption of the parameter by decrypting the outer layer, and the query is executed on the encrypted data stored in the database.

The above-described process flow is illustrated by way of example. In this example, it is assumed that the database is at its initial state (e.g., a freshly uploaded database), and all columns are encrypted using multi-layer encryption with RND being the outermost layer (as described herein). In this example, it is also assumed that the client starts by issuing the following example query (OData query):

http://host/service/people?$select=name&$filter=age ge 21*

In this example, the corresponding SQL query includes: SELECT name FROM ppl WHERE age>=21. The example query returns the names of all people in the database that are 21 and older. In this example, two columns appear in the query (name and age). Only the projection operation is used for name, so it can be encrypted using probabilistic encryption, whereas a range selection operation is performed over age. Consequently, age must be encrypted using OPE.

In view of this, the proxy then forwards the following example query message including keys to the cloud (to the application server):

http://host/service/people?$select=name&$filter=age ge $E^{OPE}(21)$

KEYS: $\mathcal{K}_{age}^{RND}$, $\mathcal{K}_{age}^{DET}$

In this example, the corresponding SQL query includes: SELECT name FROM ppl WHERE age>=$E^{OPE}(21)$.

The database driver receives the query message from the proxy, and adjusts the encryption of the database column age to OPE. More specifically, the database driver uses the keys to decrypt to the OPE layer. The query is then performed on the OPE encrypted age data and the RND encrypted name data using standard database operations (e.g., projection, range).

Continuing with this example, assume now that the client next issues the following query (e.g., SQL query as OData):

http://host/service/people?$select=name&$filter=age eq 65

In this example, the corresponding SQL query includes: SELECT name FROM ppl WHERE age=65. This query returns the names of all people aged 65. The same two columns (age, name) appear in the query, but this query requires an equi-selection operation over age. Consequently, age must be encrypted to DET.

In view of this, the proxy forwards the following example query message to the cloud (to the application server):

http://host/service/people?$select=name&$filter=age eq $E^{DET}(E^{OPE}(65))$

KEYS: $\mathcal{K}_{age}^{RND}$

In this example, the corresponding SQL query includes: SELECT name FROM ppl WHERE age=$E^{DET}(E^{OPE}(65))$. Because the proxy is unaware of the database state, it sends the key $\mathcal{K}_{age}^{RND}$, even though the age column is already OPE encrypted (lowest encryption level) as a result of the first query, described above. Consequently, the database driver does not need to perform any adjustment of the database, because the column is already encrypted using OPE. Still, the parameter of the query is encrypted using DET. The database driver uses the cached key $\mathcal{K}_{age}^{DET}$ to decrypt the query parameter $E^{DET}(E^{OPE}(65))$ to $E^{OPE}(65)$. The database driver performs the query on the encrypted database using standard database operators.

In some examples, in the case of joins, the proxy may not be able to precisely determine the necessary keys for re-encryption (or adjustment), because the current key of the column may be different depending on the sequence of previous queries. Accordingly, implementations of the present disclosure include a callback interface in the proxy for the database driver to request such keys. The proxy's response (e.g., allow, deny) to such requests from the database driver is governed based on policy checking, as described in further detail herein.

As can be seen from Table 1, not all encryption schemes support all database operations. Consequently, when chaining operations in a single query it may be the case that operators follow each other, which require incompatible encryption schemes. Examples of this include sorting or selecting aggregate values. The following example query illustrates this:

http://host/service/people?$select=zipcode, totalIncome&$orderby=totalIncome&$top=3

In this example, the corresponding SQL query includes: SELECT TOP 3 zipcode, SUM(income) FROM ppl GROUP BY zipcode ORDER BY SUM (income). This example query returns the zip codes with the top three aggregate incomes among all people. In order to execute this query, the database first needs to compute the aggregate income for all zip codes. It can do this by decrypting the data to additively HOM. Next, the database needs to sort the rows based on the aggregated values. However, sorting cannot be executed with data that this additively HOM encrypted, because it is randomized. Consequently, this query cannot be entirely executed on the database server.

Implementations of the present disclosure solve this problem by splitting the query into multiple query parts. In some implementations, the proxy sends the entire query including the appropriate encryption keys to the application and, consequently, to the database driver. Continuing with the above example, the proxy send the following example query message:

http://host/service/people/?$select=zipcode,
totalIncome&$orderby=totalIncome&$top=3
KEYS: $\mathcal{K}_{zipcode}^{RND}$ In response to the query message, the database driver builds the operator tree in relational algebra. The database driver processes the operator tree from the leaves to the root. For each node, the database driver maintains the list of supported encryption schemes. If the database driver encounters a parent that does not support any of the current encryption schemes, splits the query. The database server executes the lower query part (e.g., first query part) and the client executes the upper query part (e.g., second query part). It can be noted that processing the operator tree from the leaves ensures that the part executed by the database server is maximized. In some examples, the database driver synthesizes the upper query part of the query message to SQL, and returns the upper query part to the proxy along with the result of the lower query part.

In the running example above, the lower query part executed on the server is provided as:

SELECT zipcode, SUM(income) FROM ppl GROUP BY zipcode INTO temp

It can be noted that the proxy only needs to operate on the query syntax, and does not need to build the relational algebra of the query, because the database driver already performed the split. This avoids duplicating the query analysis work and speeds up application requests.

In some examples, the database server potentially needs to decrypt the zip code to DET for this query. In some examples, a temp database table contains all zip codes and their aggregated income. This table, along with the upper part of the query is returned to the proxy in the following example result message:

RESULT: temp[zip,sum(income)]
SELECT TOP 3*FROM temp ORDER BY sum(income)

The proxy loads the temporary table(s) into a local caching database. The proxy decrypts all values, and executes the upper query part that was provided by the database driver. The combination of the two query parts returns the same result as the original query would have. The proxy can execute the upper query part of the intermediate result, because it can decrypt the values. Because all queries can be executed on plaintext data at the proxy, the splitting algorithm enables execution of all SQL queries in accordance with the present disclosure.

It can be noted that, even in the running example provided above, the temporary table(s) may be larger than the result table. In the running example, the temporary database contains a row for each zip code, whereas the result table contains only three rows. This is inevitable given the expressive power of SQL. In an example evaluation discussed below, the expansion of message sizes due to encryption and post-processing is measured. During the example evaluation, which used real-world applications, all queries required this split. For example, for analytical applications it is typical to sort aggregate values. Without the splitting algorithm of the present disclosure, encrypting the numerical values would not be possible in analytical applications.

As introduced above, implementations of the present disclosure provide policy checking of requests received from the database driver. An advantage of adjustable encryption is the flexibility that the executed queries do not need to be known in advance, but the encryption is adjusted to the queries actually executed. This has the further advantage that the encryption does not need to foresee all possible paths through the application. Only the actually taken execution paths influence the level of encryption. Nevertheless, because the application is not static and may change, the application may seek to perform queries, which require encryption levels which are unacceptable to the client. In order to prevent this problem, implementations of the present disclosure provide a policy checking mechanism in addition to the key management in the client.

In some implementations, a policy may specify which encryption schemes are allowed for a respective database column (e.g., whether a column may be exposed in DET or OPE). In some examples, the policy can be provided for any arbitrary specifications.

To illustrate the policy check, the following examples can be considered. In one example, medical images can be stored in a cloud database, for example, in a column be named xray. In many applications, there may be little need to search these in the database. Consequently, the data can be encrypted using probabilistic encryption (RND). In some examples, this can correspond to the encryption level desirable by data protection legislation. The client can set a policy that the only allowed encryption layer for the column xray is RND, which implies that the keys $\mathcal{K}_{xray}^{DET}$ and $\mathcal{K}_{xray}^{OPE}$ are never revealed to the cloud server. Furthermore, if the client is sure that the lower encryption layers are never required (even after policy changes), it can encrypt the data only using probabilistic encryption (i.e., a single encryption layer provided as RND), thereby saving the decryption cost.

In another example, medical databases also contain the names of the patients, for example, in a column name. In some examples, because the database is normalized, the names appear only once and are later referred to by unique identifiers. Still, the names are personally identifiable data and need to be protected by strong encryption. OPE may be unacceptable and can therefore be prevented by setting an appropriate policy. For example, the policy can specify that RND and DET are the only encryption layers available for the column name. In some examples, the key $\mathcal{K}_{name}^{DET}$ will not be sent to the cloud server. Also, the same optimization of not encrypting using OPE at all, is possible in this case.

In some examples, in order to compress the policy specification to the most important security settings, a default policy of exposing all encryption layers except the plaintext can be assumed. This means that the keys $\mathcal{K}^{OPE}$ and $\mathcal{K}^{HOM}$ are retained at the client. The client then only needs to specify those columns that deviate from the regular behavior of adjustable onion encryption.

Figure 3:
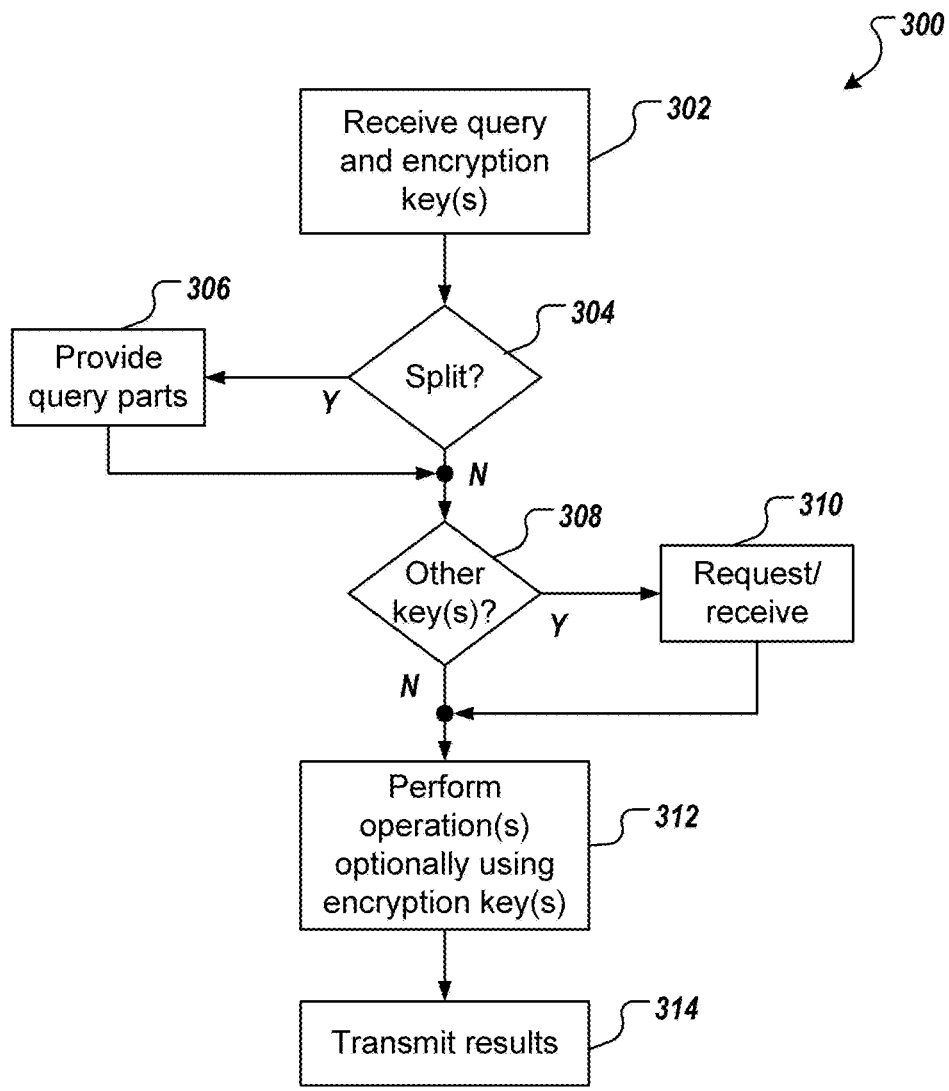
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. In some implementations, the example process 300 is executed to manage data encryption for analytical web applications accessing encrypted data in accordance with implementations of the present disclosure.

A query and one or more encryption keys are received (302). For example, a database driver executed on a server-side computing device (e.g., the database driver 234 of FIG. 2) receives the query and the one or more encryption keys from a client-side proxy (e.g., the proxy 212 of FIG. 2). In some examples, one or more encryption keys were selected by the client-side proxy based on operations required to perform the query.

It is determined whether a query split is required to execute the query (304). For example, the database driver can determine that all operations of the query cannot be performed on encrypted data (e.g., at least one operation of the query must be performed on plaintext data). If a query split is required, a plurality of query parts are provided (306). For example, the database driver can split the query into a first query part (e.g., including one or more queries) and a second query part (e.g., including one or more queries), as described herein. It is determined whether one or more other encryption keys are required to perform the query (or a query part) (308). For example, the database driver can determine that a particular re-encryption key is required (e.g., to re-encrypt a column). In some examples, the database driver cannot request (or will not be provided) keys for OPE, DET, RND, and/or HOM decryption. If it is determined that one or more other re-encryption keys are required, the one or more other re-encryption keys are requested and (maybe) received (310). For example, the database driver can request a particular encryption key from the proxy, and the proxy can provide an allow/deny decision based on one or more policies, as described herein.

In some examples, at least one operation of the query is performed using at least one encryption key (312). For example, the database driver can query the database to perform the at least one operation (e.g., of the query, of a query part). In some examples, at least a portion of encrypted data stored in the database is decrypted using the at least one encryption key to provide lower-level encrypted data in a multi-layer encryption scheme. It is appreciated, however, that, in some cases, the query can be performed without using an encryption key (e.g., use of at least one encryption key can be optional in (312)). For example, a query that includes request for the whole RND encrypted table would not require use of a key for decryption.

The query results are transmitted (314). For example, the database driver transmits the query results to the proxy. In some examples, the query results include encrypted data. In some examples, the query results include the encrypted data and a query part of the plurality of query parts. The proxy processes the query results to provide plaintext data to an end user.

As introduced above, an example evaluation of implementations of the present disclosure was conducted. In the example evaluation, the proxy component was implemented using mitmproxy, a Python proxy, and Java for query processing (including post-processing) and encryption/decryption. The modification to the database driver was performed directly inside a HANA XS application server. Table 2 provides a summary of the example test environment for the example evaluation:

An example application was selected as the SHINE Sales Dashboard, SHINE being a part of a standard SAP HANA deployment provided by SAP SE of Walldorf, Germany. In some examples, the SHINE Sales Dashboard can be described as a comprehensive analytical application developed for sales managers. In some examples, the SHINE Sales Dashboard provides several charts and tables containing the sales of a company.

Figure 4:
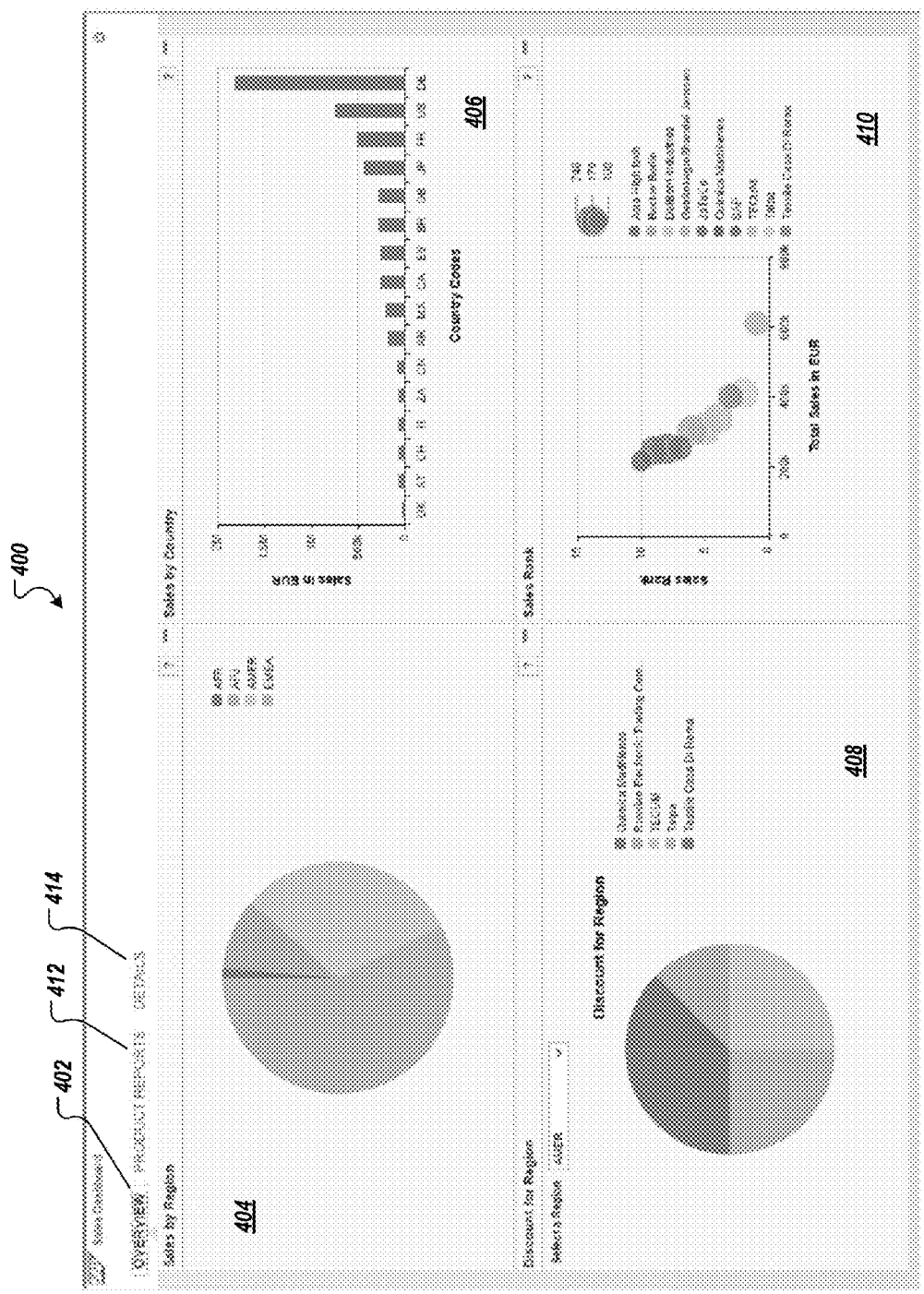
FIG. 4 depicts a screenshot of an example dashboard of an example analytical web application.

FIG. 4 depicts an example screenshot of the SHINE Sales Dashboard 400. In some examples, a first tab 402 of the SHINE Sales Dashboard 400 provides representations of sales information. In the depicted example, charts 404, 406, 408, 410 are displayed at the tab 402, which charts respectively represent the following: top left (404)→sales distribution per region (AFR, APJ, AMER, EMEA); top right (406)→sales distribution per country (e.g., DE, US, FR); bottom left (408)→companies with a discount greater than zero for a selected region (sales manager can select the region); bottom right (410)→top ten customers ordered by total sales. In some examples, sales managers are able to interact with these charts, and can, for example, dynamically see more information by hovering the mouse over a chart. Further tabs 412, 414 enable drill-down into the specific charts.

In some examples, the charts 404, 406, 408, 410 are implemented using respective OData queries, each query requiring post-processing. Consequently, no number encryption could have been integrated without the proxy architecture of the present disclosure. Each query is described in further detail below.

Top left chart (404): The query underlying the chart 404 is relatively complex. The main task of the query is to join several tables with sales order information. In the example evaluation, eight distinct tables are involved and about 10,000 unique data rows are selected during the join. The SQL query adds up the net amount for each region in the join result and sorts the total results. Implementations of the present disclosure are able to perform the complex joins and the sum of sales for each region directly on the encrypted table. Consequently, the computationally intensive part of the query (e.g., a lower query part) is performed on the server-side. However, ordering aggregate values leads to a conflict of encryption schemes, and requires post-processing (e.g., an upper query part). The post-processing is performed as described herein, and the proxy sorts the total results after decryption.

Top right chart (406): The query underlying the chart 406 is similar that underlying the chart 404, except that the sum is calculated over each country instead of each region.

Bottom left chart (408): The query underlying the chart 408 is the most complex of the queries in the example application. The join operation is equal to the join operation required in the charts 404, 406. However, the results are not just computed for this chart. Instead, four additional calcu-

TABLE 2

| | Client | Proxy | Cloud Server |
|---|---|---|---|
| | | Example Test Environment | |
| Operating system | Windows 8.1 64-Bit | SUSE Linux ES 11 64-Bit | SUSE Linux ES 11 64-Bit |
| Software | Chrome 41 | mitmproxy & Java 7 Server VM | SAP HANA SP7 |
| CPU | Intel Core I5-3320M @ 2.6 GHz | Intel Xeon E5-2670 @ 2.6 GHz | Intel Xeon E5-2670 @ 2.6 GHz |
| Memory | 8 GB | 256 GB | 256 GB |
| Network connection | 1 Gb/s | 1 Gb/s | 1 Gb/s | lations are executed: all sales from a specific region (chosen by the sales manager) within a period of time are selected and the total computed per company; the ten companies with the highest total sales are selected; the discount of these companies is evaluated based on the region, number of orders, order rank, total sales and sales rank, the order and sales ranks being classifications that are based on a comparison to other companies in the selected region and time period; and all companies with a discount greater than zero are selected.

Implementations of the present disclosure are able to perform the complex joins directly on encrypted data at the cloud provider. The first additional step requires equality matches and range queries, and can also be executed directly on the database. The second step, however, requires decryption, because it uses an order of total values. For that reason, the third and fourth steps cannot be performed at the server-side, and are performed by post-processing, as described herein. The aggregated sales figures of the first step are filtered in the second step. A temporary table resulting from the first step is potentially larger than the result of the query, because only the top ten values are selected through the filtering. In the example evaluation, there were 45 rows in the temporary table. This is still significantly smaller than the thousands of individual sales entries.

Bottom right chart (410): The query underlying the chart 410 is similar to that underlying the chart 408, except that only the sales are returned (without calculation of the discount).

In evaluating performance of implementations of the present disclosure, a measured performance metric includes page load time. In some examples, the page load time influences the user's perception of the application. In some examples, page load time is measured from the beginning of the first HTTP request (e.g., triggered by the user at the client-side) until the last HTTP response is received and displayed. For purposes of evaluation, the page load time of the plaintext version is compared to the encrypted version that is provided using implementations of the present disclosure. The example evaluation revealed that implementations of the present disclosure increase the page load time by an average factor of 1.5 including post-processing. This is an absolute value of 1.58 seconds.

The example evaluation next determined where this additional time (1.5 seconds) was spent. To do this, the time for each individual HTTP request by the client was measured. An HTTP request can be either for application resources (e.g., web pages, images), for data contents (OData requests), or join key requests in order to adjust the encryption layers per the present disclosure. The times of all HTTP requests for the application running in plaintext and encrypted using implementations of the present disclosure were added. The example evaluation revealed that the sum of the request times increases from 1.9 seconds (plaintext) to 6.1 seconds (proxy scheme of the present disclosure). This is much larger than the increase of the page load time. This is because a distributed, partially parallel system was measured, and the browser sent multiple requests in parallel and can render the display while handling further requests. Consequently, the impact of prolonged HTTP request is not immediately impacting the user. Furthermore, the example evaluation revealed that the time for application resource requests increases from 1.84 seconds (plaintext) to 5.74 seconds (proxy scheme of the present disclosure). This accounts for the majority of the increase, but is not directly connected to the processing of the proxy or the database. Instead, this can be attributed to introducing a proxy into the architecture, in hand with the not overly efficient processing of mitmproxy. It can be concluded that a dedicated, fast proxy could vastly reduce the difference between the plaintext and the encrypted versions. Overall, the content data (related to encryption) increase in the requests only accounts for less than 0.5 seconds.

The example evaluation also identified where the time introduced by encryption (the content data part of the request overhead) is spent. For each request, the time spent in the Java component of the proxy (the time for (post-) processing the query, encrypting parameters, and decrypting results) was measured. This was measured for each of the queries underlying the charts 404, 406, 408, 410 of the example application. The example evaluation revealed that the query underlying the chart 408 has the highest processing time, which is not surprising, because it is the most complex query of the queries considered. The example evaluation also revealed that the most time is spent by the database processing the encrypted values. This is also not surprising, because the database needs to perform modular multiplications for the additive homomorphic encryption. The differences between the queries are mostly accounted for by the processing time in the cryptographic part of the proxy, which can be explained by the following observations: for the second query part of the queries underlying the charts 408, 410, the proxy needs to decrypt more entries; and the proxy needs to perform more complex post-processing.

In summary, the example evaluation revealed that the encrypted processing of the example analytical application in accordance with implementations of the present disclosure adds little overhead in general, and, in particular, little overhead noticeable by the end user. The processing of encrypted data in the proxy adds comparable overhead as the processing of encrypted data in the database. Consequently, implementations of the present disclosure do not introduce a major performance bottleneck, while providing enhanced security.

Another performance metric that can be considered is message size. In particular, the expansion of messages sizes of encryption and post-processing of the present disclosure over plaintext processing can be considered. The example evaluation revealed an increase in response size (around a factor of 4) for the queries underlying the charts 404, 406, where no additional data is transferred as part of the temporary result (before post-processing). The queries underlying the charts 408, 410 show even larger increases in response size (around a factor of 13), because they also require additional data entries to be transferred to the proxy for post-processing. This increased overhead, however, is manageable in view of the enhanced security implementations of the present disclosure provide.

Another performance metric that can be considered is the level of encryption of the database, while executing the example application. As discussed above, OPE enables better cryptanalysis than DET, which enables better cryptanalysis than RND (i.e., RND is more secure than DET, which is more secure than OPE). Regardless, all columns remain encrypted at least at the OPE layer, and numbers used for aggregation can be encrypted using additively HOM. The example evaluation revealed the encryption state after executing all features of the example application, which is summarized in Table 3:

TABLE 3

| | | Encryption State | | |
|---|---|---|---|---|
| No. tables | No. columns | RND (%) | DET (%) | OPE (%) |
| 7 | 36 | 14 (39%) | 14 (39%) | 8 (22%) |

Due to the analytical nature of the example application, and the high number of joins in the example application, a relatively high number of deterministic and order-preserving encryptions were expected. However, approximately 40% of all columns are either used only for number crunching or retrieval, and thus, remain encrypted with RND. Consequently, implementations of the present disclosure provide a clear security benefit over solutions that limit the encryption of aggregate values.

The example evaluation further revealed the evolution of the encryption layers over multiple executions of the example application. The evolution can be separated into phases 1, 2 and 3, each phase corresponding to the successive execution of features as encountered during test runs of the example application. Only after all features of the example application have been executed, is the encryption state summarized in Table 3 achieved. A typical feature of the example application includes sorting by user-specified columns. Only after this sorting was explicitly triggered were columns decrypted to the OPE layer. This shows that implementations of the present disclosure increase the level of security compared to solutions that require a predefined encryption. Further, implementations of the present disclosure, only adjust the encryption to the features of the application that are actually used and executed.

Figure 5:
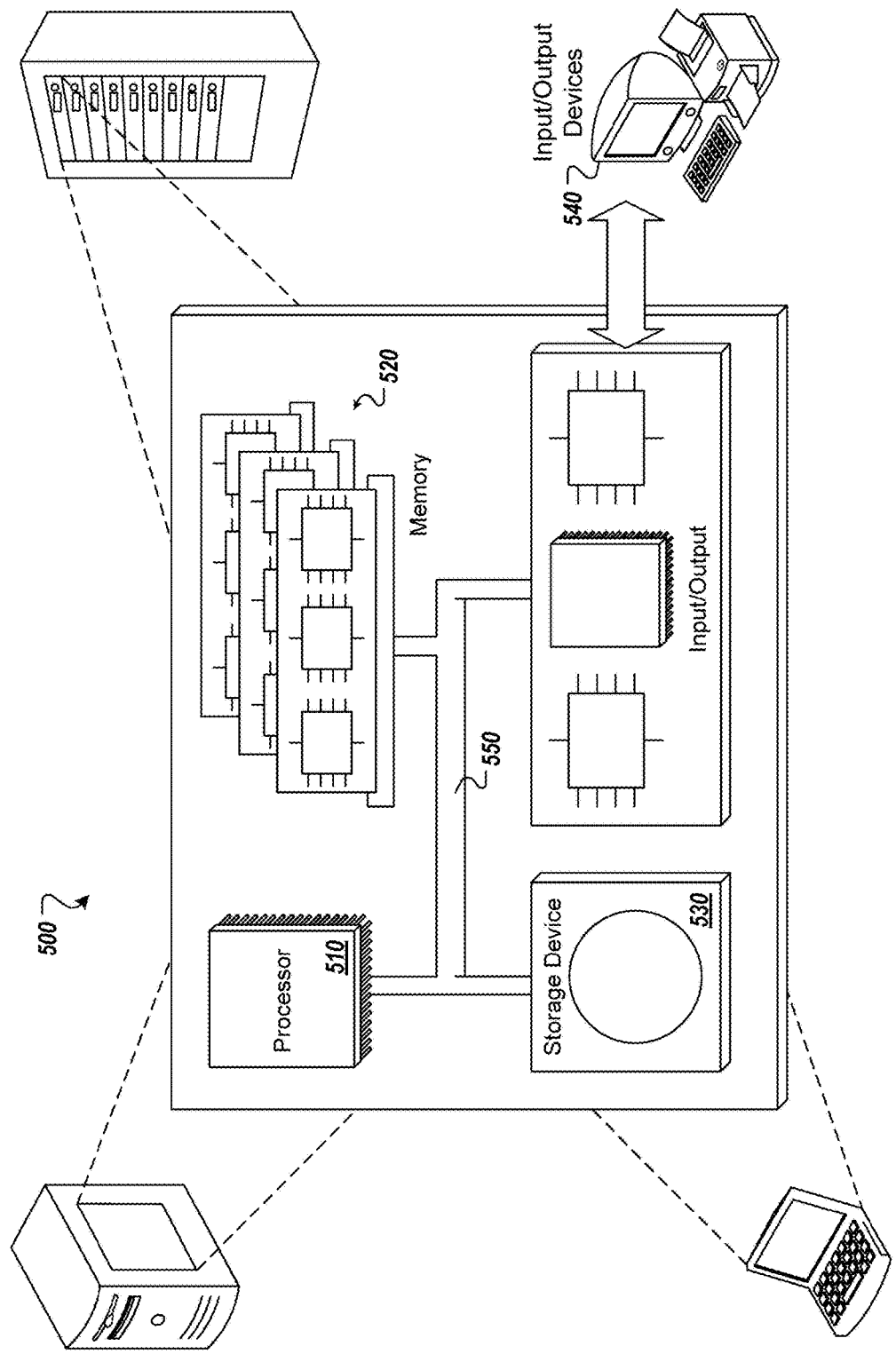
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include (e.g., a LAN, a WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for processing queries in analytical web applications over encrypted data, the method being executed using one or more processors and comprising:
    receiving, by a database driver executed on a server-side computing device and from a client-side proxy, a query and one or more encryption keys, the one or more encryption keys having been selected by the client-side proxy based on operations required to perform the query, wherein the client-side proxy is configured to be stateless where no state is maintained except for the one or more encryption keys and the database driver is configured to be modified to maintain an encryption state and a decryption state;
    performing at least one operation of the query to provide a query result comprising the encrypted data; and
    transmitting, by the database driver, the encrypted data to the client-side proxy, the client-side proxy processing the encrypted data to provide plaintext data to an end user.

2. The method of claim 1, wherein performing at least one operation of the query further comprises:
    determining, by the database driver, that a particular re-encryption key is needed;
    transmitting, by the database driver, a request for the particular re-encryption key to the proxy; and
    receiving, by the database driver, the particular re-encryption key from the proxy.

3. The method of claim 1, wherein performing the at least one operation of the query comprises decrypting at least a portion of a set of encrypted data stored in a database using an encryption key of the one or more encryption keys to provide lower-level encrypted data in a multi-layer encryption scheme, the encrypted data of the query result comprising the lower-level encrypted data.

4. The method of claim 3, wherein the lower-level encrypted data is encrypted based on at least one of deterministic encryption and order-preserving encryption.

5. The method of claim 4, further comprising:
    providing, by the database driver, a first query part and a second query part based on the query, the first query part comprising the at least one operation;
    transmitting, by the database driver, the second query part to the client-side proxy with the lower-level encrypted data, wherein processing the lower-level encrypted data to provide plaintext data is performed by the proxy based on the second query part.

6. The method of claim 1, wherein the proxy comprises an order-preserving encryption scheme.

7. The method of claim 1, wherein the query comprises at least one encrypted parameter.

8. A non-transitory computer-readable storage medium coupled to one or more processors and having instructions stored thereon which, when executed by the one or more processors, cause the one or more processors to perform operations for processing queries in analytical web applications over encrypted data, the operations comprising:
    receiving, by a database driver executed on a server-side computing device and from a client-side proxy, a query and one or more encryption keys, the one or more encryption keys having been selected by the client-side proxy based on operations required to perform the query, wherein the client-side proxy is configured to be stateless where no state is maintained except for the one or more encryption keys and the database driver is configured to be modified to maintain an encryption state and a decryption state;
    performing at least one operation of the query to provide a query result comprising the encrypted data; and
    transmitting, by the database driver, the encrypted data to the client-side proxy, the client-side proxy processing the encrypted data to provide plaintext data to an end user.

9. The computer-readable storage medium of claim 8, wherein performing at least one operation of the query further comprises:
    determining, by the database driver, that a particular re-encryption key is needed;
    transmitting, by the database driver, a request for the particular re-encryption key to the proxy; and
    receiving, by the database driver, the particular re-encryption key from the proxy.

10. The computer-readable storage medium of claim 8, wherein performing the at least one operation of the query comprises decrypting at least a portion of a set of encrypted data stored in a database using an encryption key of the one or more encryption keys to provide lower-level encrypted data in a multi-layer encryption scheme, the encrypted data of the query result comprising the lower-level encrypted data.

11. The computer-readable storage medium of claim 10, wherein the lower-level encrypted data is encrypted based on at least one of deterministic encryption and order-preserving encryption.

12. The computer-readable storage medium of claim 11, wherein the operations further comprise:
    providing, by the database driver, a first query part and a second query part based on the query, the first query part comprising the at least one operation;
    transmitting, by the database driver, the second query part to the client-side proxy with the lower-level encrypted data, wherein processing the lower-level encrypted data to provide plaintext data is performed by the proxy based on the second query part.

13. The computer-readable storage medium of claim 8, wherein the proxy comprises an order-preserving encryption scheme.

14. The computer-readable storage medium of claim 8, wherein the query comprises at least one encrypted parameter.

15. A system, comprising:
    a server-side computing device; and
    a computer-readable storage device coupled to the computing device and having instructions stored thereon which, when executed by the computing device, cause the computing device to perform operations for processing queries in analytical web applications over encrypted data, the operations comprising:

receiving, by a database driver executed on the server-side computing device and from a client-side proxy, a query and one or more encryption keys, the one or more encryption keys having been selected by the client-side proxy based on operations required to perform the query, wherein the client-side proxy is configured to be stateless where no state is maintained except for the one or more encryption keys and the database driver is configured to be modified to maintain an encryption state and a decryption state;

performing at least one operation of the query to provide a query result comprising the encrypted data; and transmitting, by the database driver, the encrypted data to the client-side proxy, the client-side proxy processing the encrypted data to provide plaintext data to an end user.

16. The system of claim 15, wherein performing at least one operation of the query further comprises:

determining, by the database driver, that a particular re-encryption key is needed;

transmitting, by the database driver, a request for the particular re-encryption key to the proxy; and receiving, by the database driver, the particular re-encryption key from the proxy.

17. The system of claim 15, wherein performing the at least one operation of the query comprises decrypting at least a portion of a set of encrypted data stored in a database using an encryption key of the one or more encryption keys to provide lower-level encrypted data in a multi-layer encryption scheme, the encrypted data of the query result comprising the lower-level encrypted data.

18. The system of claim 17, wherein the lower-level encrypted data is encrypted based on at least one of deterministic encryption and order-preserving encryption.

19. The system of claim 18, wherein operations further comprise:

providing, by the database driver, a first query part and a second query part based on the query, the first query part comprising the at least one operation;

transmitting, by the database driver, the second query part to the client-side proxy with the lower-level encrypted data, wherein processing the lower-level encrypted data to provide plaintext data is performed by the proxy based on the second query part.

20. The system of claim 15, wherein the proxy comprises an order-preserving encryption scheme.

* * * * *